US005878283A

United States Patent [19]

House et al.

[11] Patent Number: 5,878,283
[45] Date of Patent: Mar. 2, 1999

[54] SINGLE-USE CAMERA WITH MOTION SENSOR

[75] Inventors: Gary Lawrence House, Victor; Richard Peter Szajewski, Rochester, both of N.Y.

[73] Assignee: Eastman Kodak Company, Rochester, N.Y.

[21] Appl. No.: 711,351

[22] Filed: Sep. 5, 1996

[51] Int. Cl.[6] .................................................. G03B 17/24
[52] U.S. Cl. .............................. 396/6; 396/263; 396/427; 396/429; 396/502
[58] Field of Search ............................... 396/6, 332, 171, 396/263, 419, 427, 429, 502

[56] References Cited

U.S. PATENT DOCUMENTS

| | | |
|---|---|---|
| 2,042,983 | 6/1936 | Fairchild ................................. 396/332 |
| 4,245,254 | 1/1981 | Svensson et al. . |
| 4,309,603 | 1/1982 | Stauffer . |
| 4,346,971 | 8/1982 | Johnson et al. . |
| 4,383,744 | 5/1983 | O'Connell . |
| 4,473,285 | 9/1984 | Winter . |
| 4,490,028 | 12/1984 | Kucher . |
| 4,531,822 | 7/1985 | Shenk . |
| 4,667,188 | 5/1987 | Schwartz . |
| 4,695,959 | 9/1987 | Lees et al. . |
| 4,734,725 | 3/1988 | Bierman ................................. 396/427 |
| 4,757,337 | 7/1988 | Shikaumi . |
| 4,896,178 | 1/1990 | Ohmura et al. . |
| 4,954,858 | 9/1990 | Ohmura et al. . |
| 5,006,832 | 4/1991 | Beaudry . |
| 5,014,126 | 5/1991 | Pritchard et al. . |
| 5,076,686 | 12/1991 | Preston . |
| 5,086,311 | 2/1992 | Naka et al. . |
| 5,092,670 | 3/1992 | Preston . |
| 5,113,253 | 5/1992 | Pritchard et al. . |
| 5,155,474 | 10/1992 | Park et al. . |
| 5,157,484 | 10/1992 | Pritchard et al. . |
| 5,164,835 | 11/1992 | Yamada et al. . |
| 5,170,199 | 12/1992 | Nakai et al. . |
| 5,235,364 | 8/1993 | Ohmura et al. . |
| 5,262,813 | 11/1993 | Scharton . |
| 5,315,332 | 5/1994 | Hirasaki et al. . |
| 5,323,140 | 6/1994 | Boyles . |
| 5,325,193 | 6/1994 | Pritchard et al. . |
| 5,335,042 | 8/1994 | Imafuji et al. . |
| 5,337,099 | 8/1994 | Tasaka et al. . |
| 5,345,824 | 9/1994 | Sherman et al. . |
| 5,353,076 | 10/1994 | Goddard . |
| 5,361,111 | 11/1994 | Yamashina et al. . |
| 5,417,111 | 5/1995 | Sherman et al. . |
| 5,448,320 | 9/1995 | Sakai et al. ............................. 396/427 |
| 5,465,604 | 11/1995 | Sherman . |
| 5,610,580 | 3/1997 | Lai ......................................... 396/427 |

FOREIGN PATENT DOCUMENTS

| | | |
|---|---|---|
| 643215 | 9/1950 | United Kingdom . |
| 2 208 557 | 4/1989 | United Kingdom . |
| 2 224 358 | 5/1990 | United Kingdom . |
| 2 253 067 | 8/1992 | United Kingdom . |
| 2 282 331 | 3/1995 | United Kingdom . |

*Primary Examiner*—David M. Gray
*Attorney, Agent, or Firm*—Paul A. Leipold

[57] ABSTRACT

The invention relates to single use cameras. In particular it relates to a single use camera that incorporates a motion sensor. The motion sensor enables automatic activation of various camera features and utilities. These include the automatic activation of such normal camera actions as shutter release and the taking of a photograph, activation of a flash unit either to aid in the taking of a photograph or as a warning or signaling device and activation of an incorporated audible alarm.

24 Claims, 12 Drawing Sheets

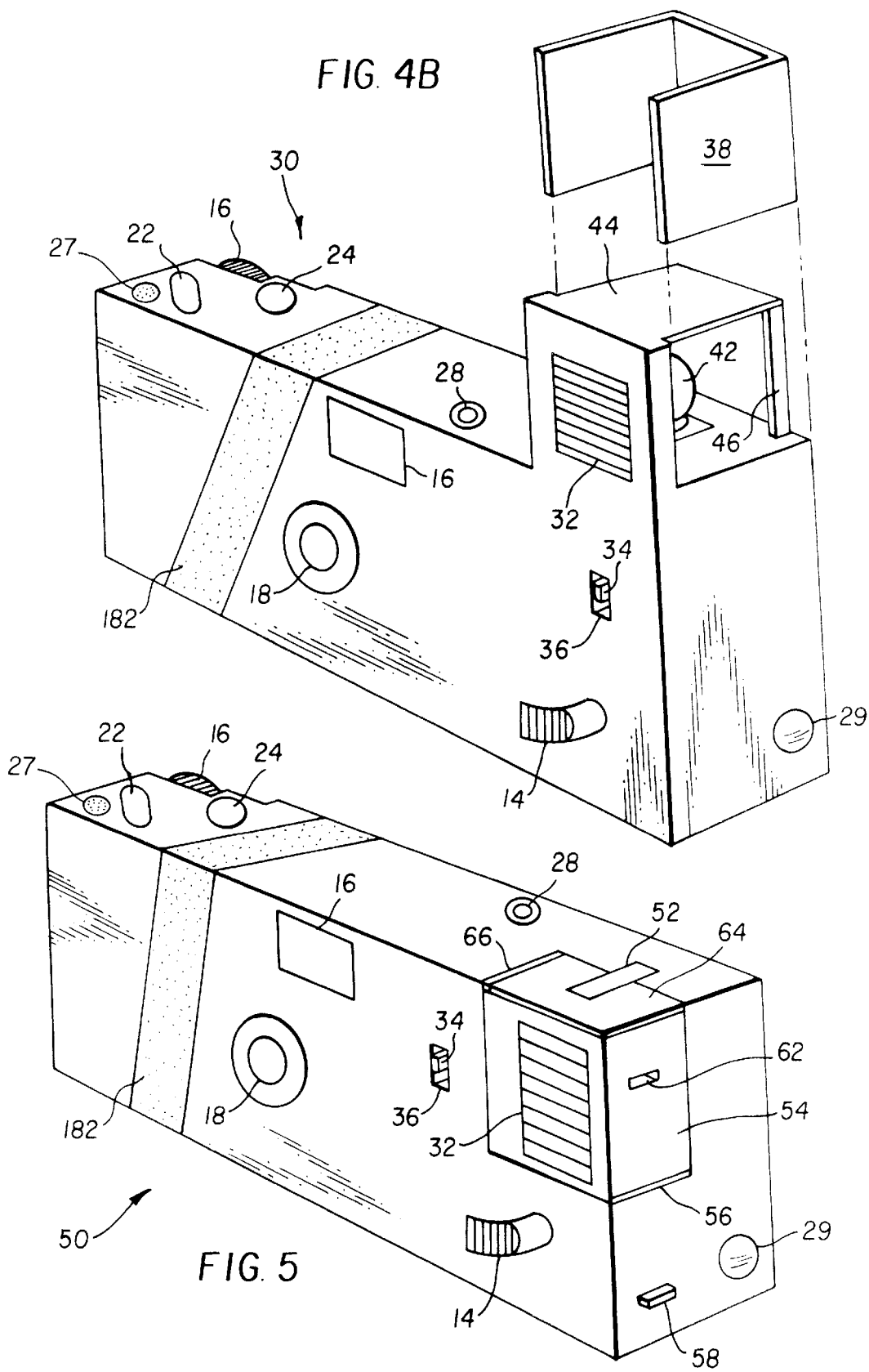

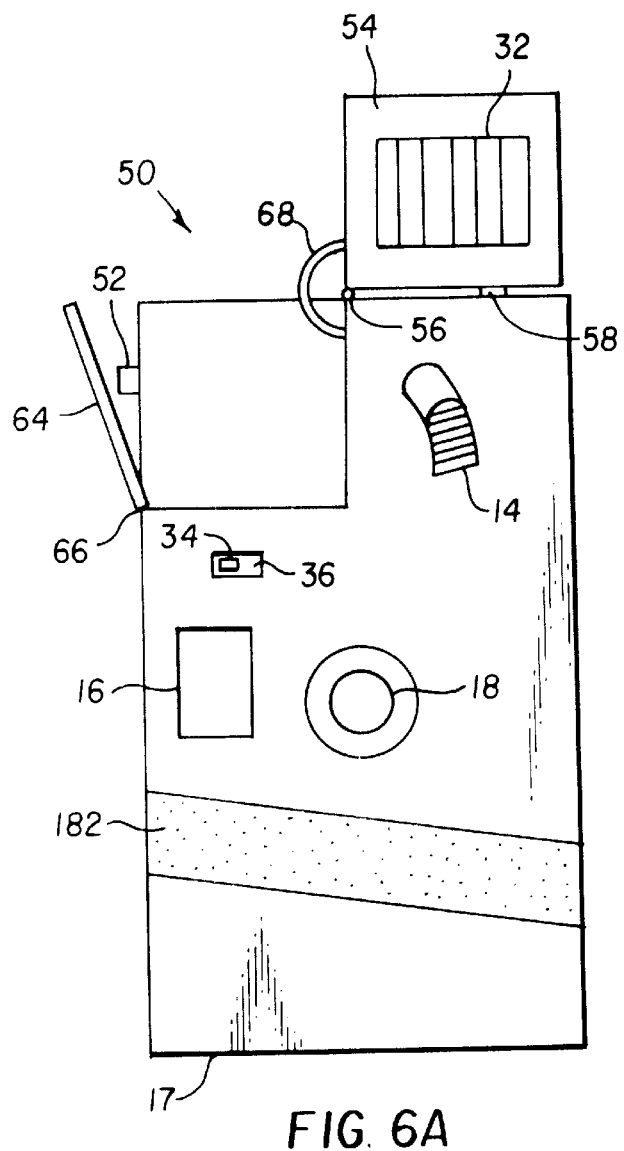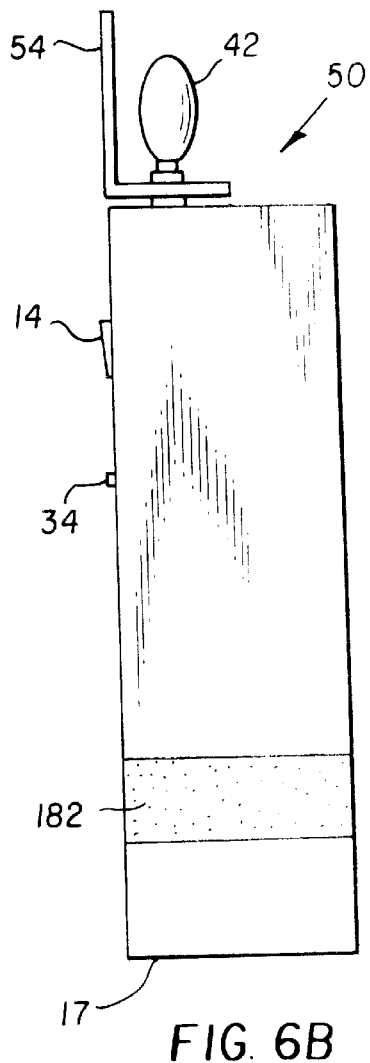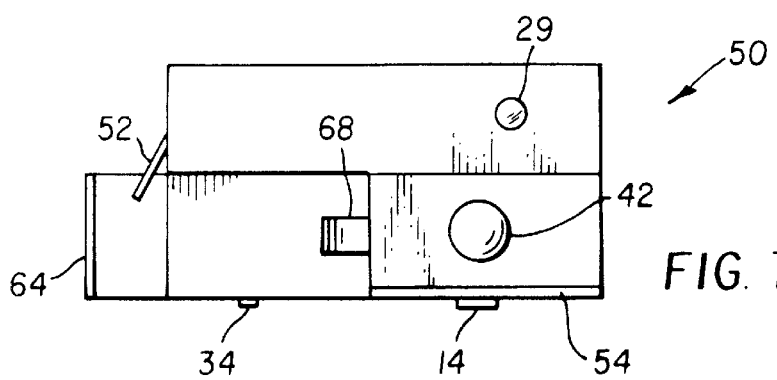

SINGLE-USE CAMERA WITH MOTION SENSOR

FIELD OF THE INVENTION

This invention relates to single-use cameras. It particularly relates to a flash camera that also incorporates an accelerometer.

BACKGROUND OF THE INVENTION

Single-Use Cameras, also known as Film with Lens Units One-Time-Use Cameras or Recyclable Cameras, have provided the camera user with a miniaturized, inexpensive, rugged and easy to operate alternative to traditional camera designs. As a result, these Single-Use Cameras are often carried by their owners on a regular basis and employed under conditions where owners would not normally take expensive cameras. These modern Single-Use Cameras are now available with many amenities designed to make picture taking more enjoyable and easier under a variety of environmental or lighting conditions. For example, these cameras are now available with flash units designed to widen the range of suitable lighting conditions. Other units are available in water resistant housings, or in submersible housings for underwater photography, and with modified film formats, for example, panoramic formats. These are all designed to encourage carrying the camera around in daily activities, or in travel, or in adventurous vacation settings that may subject both the camera and user to risks of weather, accessibility, or even danger. Manufacturers have even encouraged the storage of such cameras in auto glove compartments so that they can be available to record damage from auto accidents. Representative examples of Single-Use Cameras are described in U.S. Pat. Nos. 4,896,178; 4,954,858; 5,086,311; 5,170,199; 5,235,364; 5,315,332; 5,337,099; 5,353,076 and 5,361,111.

Motion sensors capable of activating other devices are known. These motion sensors can vary in size, complexity and mode of operation. They can sense either changes in their environment as, for example, inductive and infrared proximity detectors and both infrared and visible beam driven range finders. Alternatively, they can sense changes in their position as, for example, inertial accelerometers. Accelerometers are electromechanical devices which change in conductivity or output when moved, jostled, or otherwise physically disturbed. Recent disclosures of accelerometers and their uses include the portable alarms described at Beaudry, U.S. Pat. No. 5,006,832 and at Schwartz, U.S. Pat. No. 4,667,188; the auto anti-theft system described at Boyles, U.S. Pat. No. 5,323,140 and the microaccelerometers described by Brokaw et al at U.S. Pat. Nos. 5,345,824 and 5,417,111.

PROBLEMS TO BE SOLVED BY THE PATENT

While these cameras are certainly excellent for their intended use, i.e recording scenes, the additional features, such as the incorporated power sources and circuitry associated with the incorporated flash units, represent an as yet untapped opportunity to provide the consumer with additional values. Their convenience for travel and storage in vehicles also provides opportunity to increase value.

In particular, current cameras are deficient in that operation of both the picture taking function and any available ancillary functions requires active intervention by the user.

SUMMARY OF THE INVENTION

It is an object of the invention to provide additional features in a single-use camera.

It is another object of the invention to provide a camera-motion activated camera.

It is yet another object of the invention to provide a camera-motion activated signaling device.

It is yet a further object of the invention to provide a camera-motion activated warning device.

These and other objects of the invention generally are accomplished by providing a camera comprising a motion sensor means to activate at least one device by said motion sensor after motion is detected.

In a preferred embodiment, the object of the invention is accomplished by providing: A camera comprising:
(a) a body;
(b) a lens mounted to said body, said lens defining a lens-plane with two sides;
(c) a light sensitive photographic element contained within said body and positioned to be exposable through said lens;
(d) a shutter mounted to said body and positioned between said lens and said element;
(e) a power source;
(f) a viewfinder mounted to said body for viewing the scene to be photographed wherein the scene-plane defined by the viewfinder and the lens-plane are substantially parallel;
(g) a motion sensor mounted to said body;
(h) at least one device chosen from the group consisting of
  (1) a flash and a flash-unit circuit powered by the power source which enables light emission suitable for picture taking from said flash;
  (2) a flash and an intermittent-flash circuit powered by the power source which enables repetitive light emission from said flash at a frequency and duration suitable for emergency flashing;
  (3) a siren powered by the power source;
  (4) a shutter release mounted to said body for releasing said shutter; and
  (5) a continuous illumination means and a continuous illumination circuit powered by said power source which enables operation of said continuous illumination means; and
(i) means for activating said at least one device after motion is detected by the motion sensor.

It is especially preferred that the camera of the invention comprising a light sensitive photographic element is chosen from the group consisting of a silver halide film and a semiconductor array, and that at least one of Conditions A, B, C, D, E, and F is fulfilled; said Conditions being:
(A) the camera body has a total volume of up to about 450 cubic centimeters and a width to height to length ratio of about 1:2:4;
(B) the camera lens is permanently mounted to the body and has a focal length of between about 10 and 100 mm and an aperture of between about f/2 and f/32;
(C) the light sensitive photographic element is characterized in having a photographic sensitivity of between about ISO 100 and ISO 3200 and an exposure latitude greater than about 2.1 log E; and
(D) the shutter enables exposure of said element for less than about $\frac{1}{100}$ second;
(E) the motion sensor is chosen from the group consisting of an accelerometer, a magnetic proximity detector, an inductive proximity detector, and an infrared proximity detector; and (F) the camera comprises means to adjust at least one of the motion sensitivity and the activation threshold of the motion sensor.

ADVANTAGEOUS EFFECT OF THE INVENTION

This invention provides the advantage that the power source and flash unit of a camera are utilized for multiple purposes. This invention further provides the advantage that the camera may be utilized in novel ways.

The flash unit may be set to activate based on motion of an unattended camera, thus functioning as a safety or warning device as, for example, by leaning the camera against the door of a hotel room while the user sleeps, and thereby warning the user of an intruder. In an analogous manner, the camera may additionally include an audible signal which may be motion activated, thereby sounding an alarm in similar circumstances.

In another embodiment, the camera may be set to photograph a scene or scenes based on camera motion, thereby acting as a motion sensitive recording device. In one use such a camera may provide a means of vehicle protection on being installed in an unattended vehicle and set to photograph an intruder or another vehicle striking the protected vehicle. A camera also could be placed on a bird feeder to photograph birds as they land and move the camera.

BRIEF DESCRIPTION OF THE DRAWINGS

FIG. 4B illustrates in perspective the camera of FIG. 4A in mode for continuous intermittent flashing as a warning device.

FIG. 5 is a perspective view of a camera of conventional rectangular profile that may be converted to continuous intermittent flashing.

FIGS. 6A, 6B, and 7 illustrate the camera of FIG. 4 in front, side, and top views when in position for continuous flashing with substantially 360-degree viewing.

DETAILED DESCRIPTION OF THE INVENTION

The invention has numerous advantages over the prior products for providing motion sensitive emergency warning by light, sound, reflection, taking pictures, and providing continuous temporary illumination. Only one item needs to be carried rather than three or four. Further, that item is low in cost and may be renewed when the pictures have been taken and the camera is taken in for development. The addition of a motion detector, continuous light source and circuitry for continuous flashing of the picture taking strobe and sounding of a siren add relatively little to the cost of the camera while greatly improving its functionality. Further, it replaces these separate devices. Strobes, sirens, and flashlights are stored for emergency situations. Often the batteries of the strobe and the flashlight expire prior to their use unless they are conscientiously replaced. In contrast, when these devices are added to a camera, the camera may both be used to take pictures in the ordinary manner, and be available for emergency use. The invention also provides a camera that has the additional advantage that the subject matter of flash pictures in the dark may be illuminated with the flashlight so that the camera can be properly pointed toward the subject to be taken by flash photography and the picture be properly composed. The motion sensor single-use camera also would provide the ability to take low cost pictures of animals at bird feeders and trails.

It is the intent of this invention to provide added benefit to the consumer by providing a motion sensitive single-use camera unit with integral flash that also provides a repetitive flashing function or a continuous illumination function especially valuable for those unforeseen circumstances that occasionally occur even during seemingly normal life. The single-burst or repetitive siren, continuous on siren, reflection means, emergency flashing function, or continuous lighting function is especially valuable during automobile, boating, or camping trips, or in the event of mishap, accident, emergency or natural disaster. These and other advantages will be apparent from the detailed description below.

Figure 1:
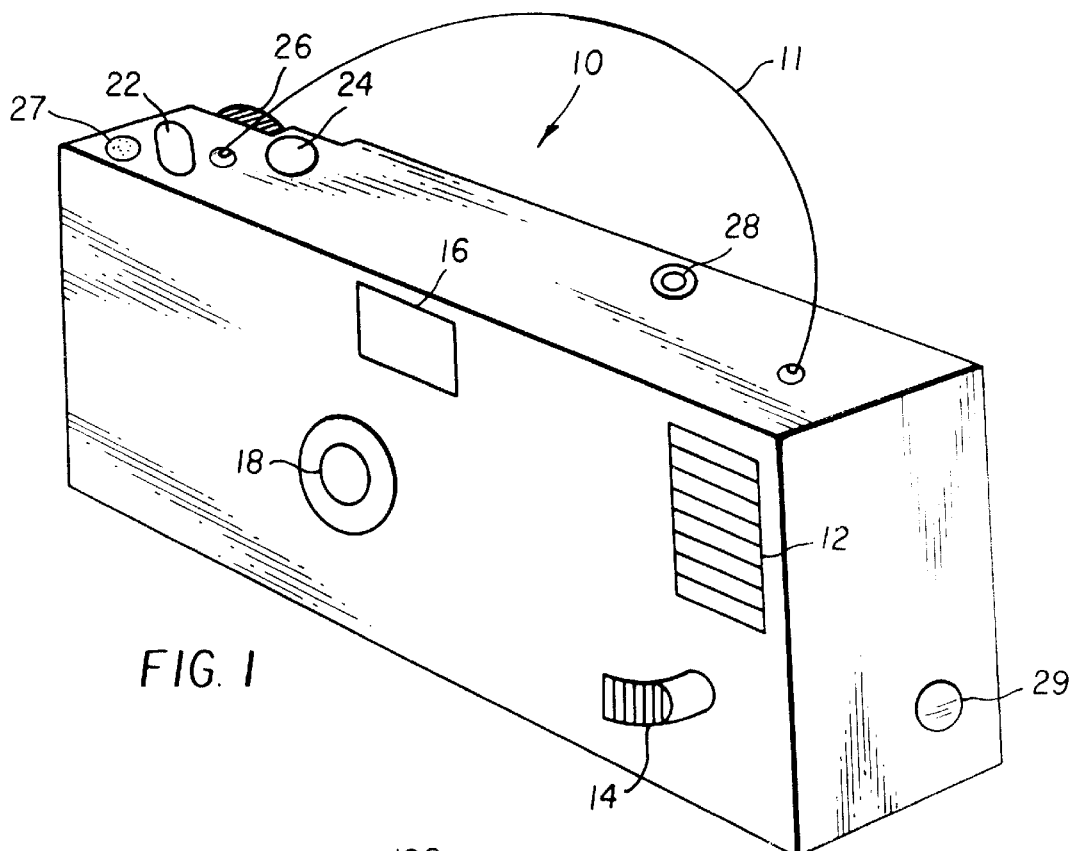
FIG. 1 is a perspective view of a single-use flash camera of the invention.

Illustrated in FIG. 1 is a camera 10 representative of the invention. The camera is a single-use camera that is provided with a flash 12. The flash 12 is activated by switch 14. The scene to be photographed is viewed through viewfinder 16 with photographs being taken through lens 18. The camera 10 is further provided with shutter release button 22 and film frame counter 24. The film is advanced between pictures by film advance wheel 26. 28 is the flash ready indicator light that lights when the flash is ready for picture taking. 27 is a motion-sensor activation switch. 29 is a motion sensor ready indicator light. 11 is a member suitable for suspending the camera body as, for example, from a hook or doorknob. The hanging member 11 may be plastic, metal, or leather straps. A hook or velcro fastener also could be used. The camera will expose a picture if it is moved after the motion sensor is activated. Cameras such as 10, while containing a flash device and batteries, do not provide means for providing a steady illumination such as a flashlight illumination or providing a continuing flashing to serve as a warning.

Figure 2:
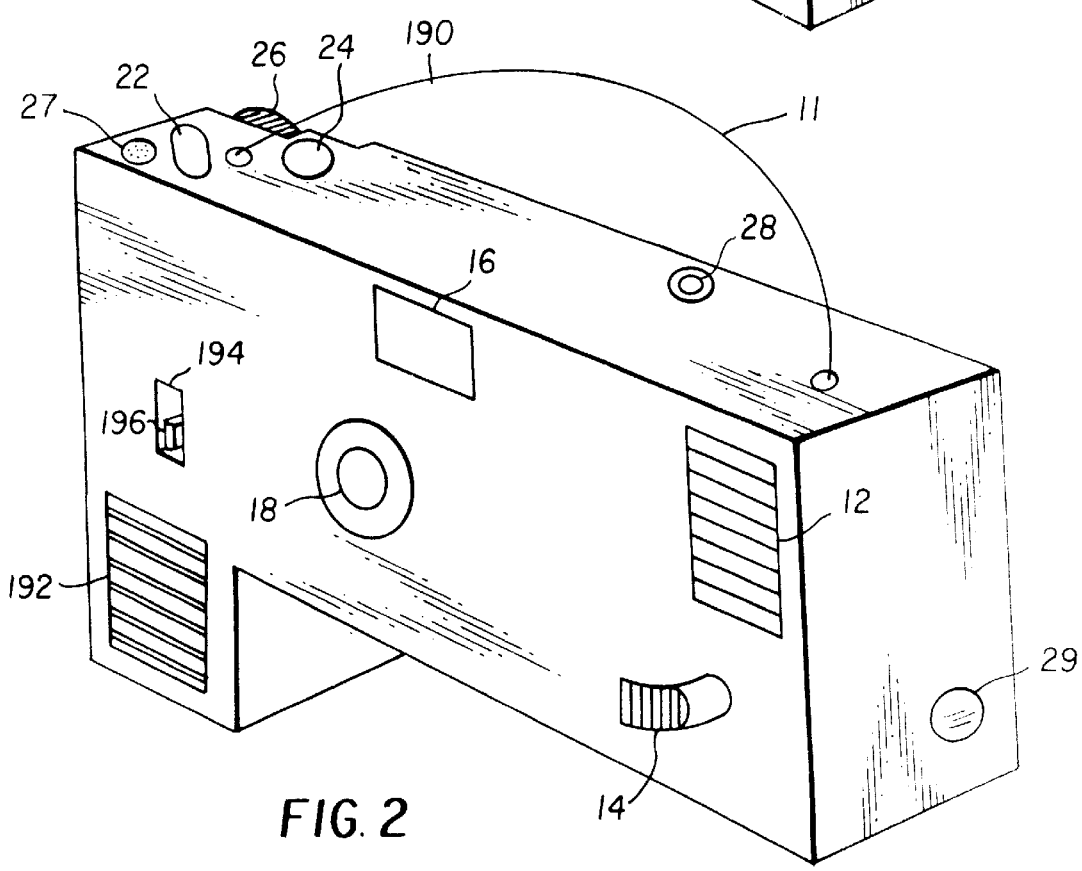
FIG. 2 is a perspective view of a camera of the invention providing a siren.

FIG. 2 illustrates camera 190 that is a single-use camera that is provided with a siren 192. Elements common to the camera of FIG. 1 are indicated with the same numeral and are not repeated. Here the motion sensor circuit is wired to activate the siren. Acceleration of the camera sets off an audible warning. Alternatively, the siren is activated by movement of switch 196 to the upper position in switch pad 194. While the term "siren 192" is utilized, the term "siren" is intended to include any loud noise-making device such as bells, whistles, horns, or the classic siren sound. Generally, whatever was cheapest and loudest would be utilized in the single-use camera. Specifically contemplated are siren or horn units employed in personal body alarms or safety alarms which emit loud piercing sound either intermittently via a squeeze switch or in continuous mode following removal of a pull cord pin. Such a pull cord pin makes the alarm difficult or impossible to turn off, so the alarm could not be silenced by an assailant. Such units are compact and readily fit within the palm of the hand, and serve as a deterrent to assault or to threatening animals, or serve to call for help in the case of an emergency or accident. It is preferred the siren emit a sound of at least 50 decibels, preferably 80 decibels, and most preferred in excess of 100 decibels. Typical sirens useful in the practice of this invention are described in Leitten et al U.S. Pat. Nos. 5,258,746 and 5,420,570; Livingstone U.S. Pat. No. 5,075,671; Corbin U.S. Pat. No. 5,032,824; Beaudry U.S. Pat. No. 5,006,832; Petri U.S. Pat. No. 4,806,911; Hopkins et al U.S. Pat. No. 4,719,454; and Schwartz U.S. Pat. No. 4,667,188. It is also possible that the siren switch would be formed such that the siren is not easily shut off or is impossible to turn off, as the siren then could not be silenced by an attacker.

Figure 3:
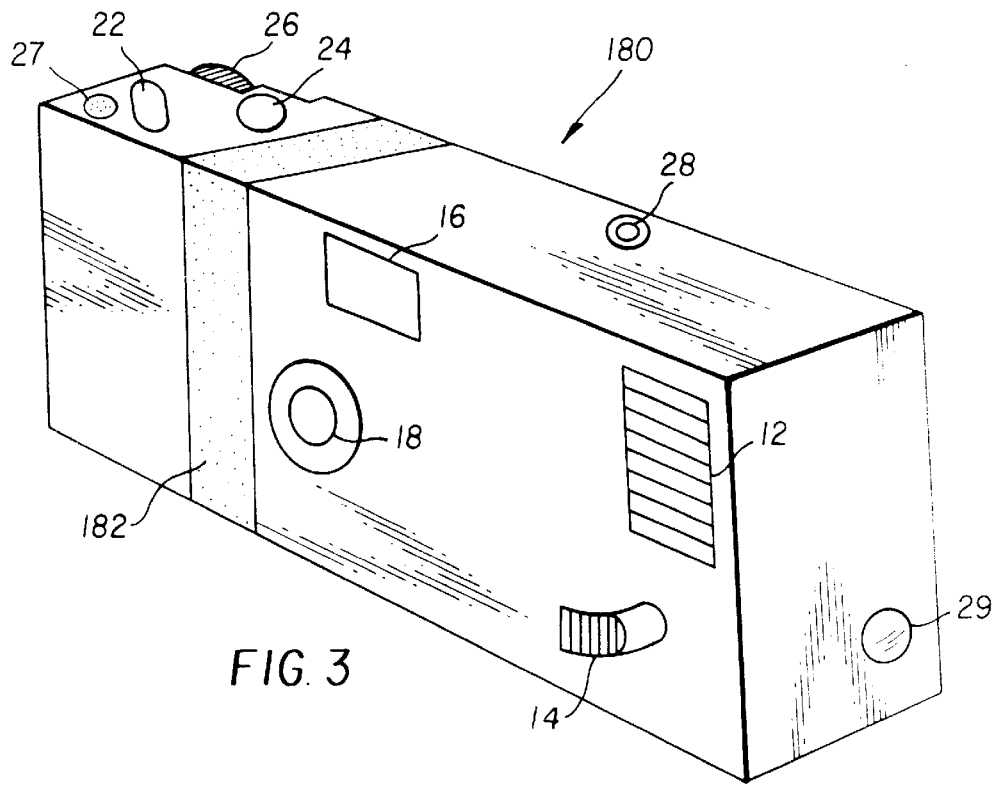
FIG. 3 illustrates in perspective a camera of the invention with a reflective area.

In FIG. 3 is illustrated an embodiment of the invention wherein the camera 180 is provided with a reflective stripe 182. A reflective stripe could be added as tape to the packaging or could be formed as an integral part of the wrapping of the camera. Such reflective materials are well known and are used to serve as warnings along highways. Further tapes are available for attachment to bicycles, vehicles, pedestrians, and life jackets to provide reflective capabilities and would be suitable for the camera of the invention. Specifically contemplated reflecting materials are adhesive-coated plastic films that comprise microscopic glass beads, or another brightness enhancing technique of plastic arrayed with microprisms, formed, for example, by microreplication techniques wherein a plastic surface is engraved by appropriate microscopic cutters. Such reflectors concentrate and direct the reflected light to boost its intensity and, therefore, increase visibility. It is preferred to apply the plastic reflecting material via an adhesive backing to the camera body. Alternately, reflective, fluorescing, or phosphorescing coatings or paints could be applied directly to the camera body, or the body itself may be formed directly from plastic having these properties.

The reflective materials useful in the practice of this invention can be any known in the art. The reflective materials can be applied in known ways, including but not limited to being applied as adhesive sheets, being applied as direct coatings, being incorporated into the camera body wrapping or being incorporated directly in the camera body during its formation. Particularly contemplated are reflective paints, dry paint films, fluorescent coatings, phosphorescent coatings, metalized coatings including aluminized mylar, reflective metallic films or metals including noble metals and gold leaf, reflective plastics, luminous coatings, reflective microspheres, retro-reflective surfaces, retro-reflective micro-prims, holographic metallized mirrors, and retro-reflective sheets. Of these, the retro-reflective and holographic materials are particularly preferred.

Technologies useful for achieving these ends are described in Chung et al U.S. Pat. No. 4,456,336; Appeldorn et al U.S. Pat. Nos. 4,775,219 and 4,938,563; Rowland U.S. Pat. Nos. 5,376,431 and 5,229,882; Martin U.S. Pat. No. 5,264,063; Koizumi U.S. Pat. No. 5,349,920; Weber U.S. Pat. No. 4,682,852; Hotchkiss et al U.S. Pat. No. 4,629,667; McCoy et al U.S. Pat. No. 5,237,449; and Ellison et al U.S. Pat. Nos. 4,810,540 and 4,931,324 and European Patent Application 0 266 107.

Figure 4A:
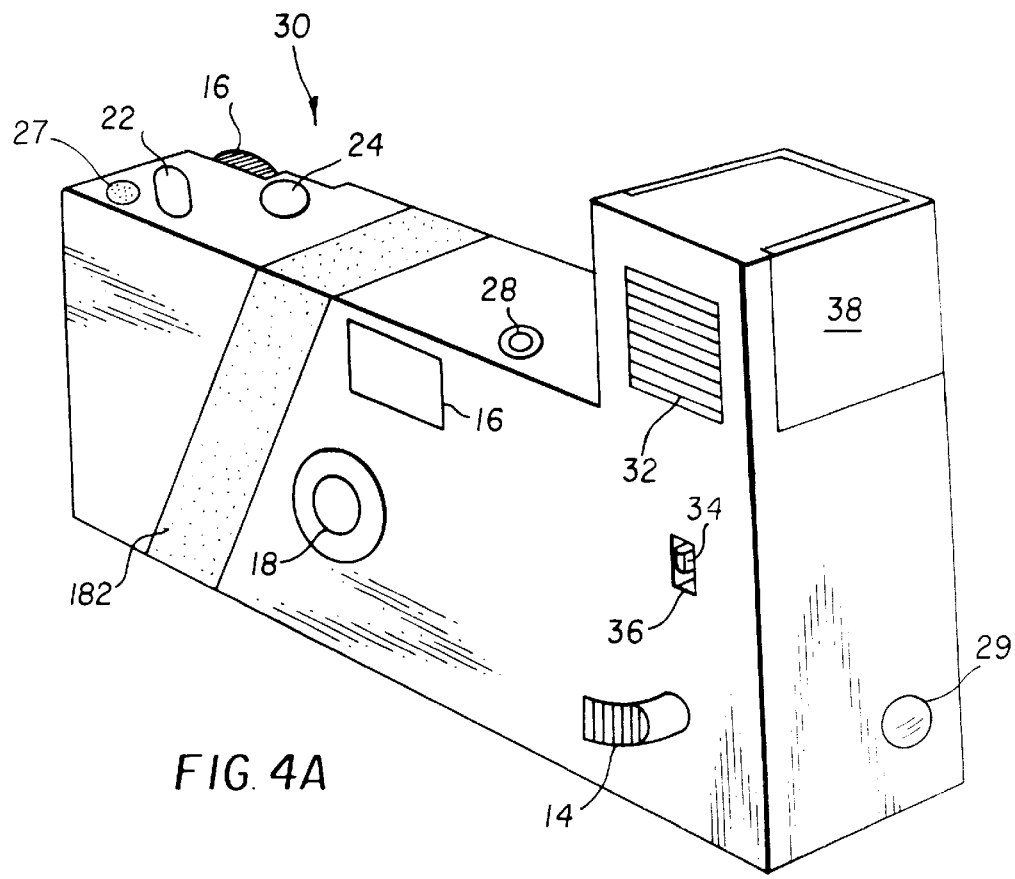
FIG. 4A is a perspective view of a camera of the invention providing both continuous intermittent flashing and flash exposure for photography.

Illustrated in FIGS. 4A and 4B is a single-use camera 30 with reflector 182 that provides the option of continuous flashing. Elements common to the previously described camera are indicated with the same numerals and will not be repeated. Camera 30 has a flash unit 32 that is utilized for flash pictures when activated by switch 14. Here the motion sensor circuit is wired to activate the continuous flash function by activating the continuous flash circuitry to be described in detail below. Acceleration of the camera thus sets off a visible warning. Switch 34 may be moved to a lower position 36 where circuitry, to be described later, allows the bulb to be intermittently flashed continuously until the switch is returned to the upper position.

When the camera 30 is to be utilized in the continuous flash mode as a warning light, the removable cover member 38 may be taken off as shown in FIG. 4A. This will allow the bulb 42 to be visible for substantially 360 degrees through the original flash opening 32, as well as on the back and sides of the camera 30. The bulb remains protected from the top by a permanently installed cover 44 which is supported by posts at the corners such as 46. It is also possible that the bulb 42 may be surrounded by transparent members at the back and sides that will be exposed by removable cover 38. Such protective members could incorporate lenses that would direct the light directly away from the camera such that it is better focused for warning at a greater distance, as well as protecting the bulb from abuse. However, as the camera probably would be only used in the emergency flashing mode once, such protection may not be necessary. The flashing mode would flash more often than once every 10 seconds. It is generally preferred for cameras of this invention that flashing be between about once every 1 and about once every 5 seconds. The duration of an individual flash would generally be less than about one second and preferably less than about 0.5 seconds. The emergency flashing ratio, that is, the duration of an individual flash relative to the time elapsed between initiation of successive flash is preferred to be between about 1% and 50%.

FIGS. 5, 6A, 6B, and 7 illustrate an alternative version of a camera with reflector 182 which may be converted to continuous flashing mode with substantially 360 degree vision. This camera 50 illustrated in FIGS. 5, 6A, 6B, and 7 maintains the generally cubical profile of the prior art camera 10 of FIG. 1, while still presenting substantially 360 degree viewing of the intermittent flash when it is activated. To utilize the continuous flash of this camera, hold down tab 52 is released allowing flash unit 54 to pivot on hinge 56. When the flash unit 54 pivots, there is a latching means comprised of protrusion 58 which fits into hole 62. The top piece 64 of flash unit 54 is raised using hinge 66 to allow the flash unit 54 to pivot. When the unit pivots, the wires 68 are of sufficient length that they may extend to the rotated position of the unit 54. As illustrated in FIGS. 6A, 6B, and 7 where the flash unit 54 has been pivoted, the bulb 42 is visible for substantially 360 degrees. The camera may be set on end 17 for viewing of the bulb 42 in all directions. As stated with reference to camera 30, the bulb 42 may be provided with a protective covering in the rotated position that would serve to protect and could have a lens to direct the light horizontally when the camera was placed on its end. This would serve to extend the visible warning distance when the camera is activated by the motion sensor or turned on to the intermittent flash.

Figure 8A:
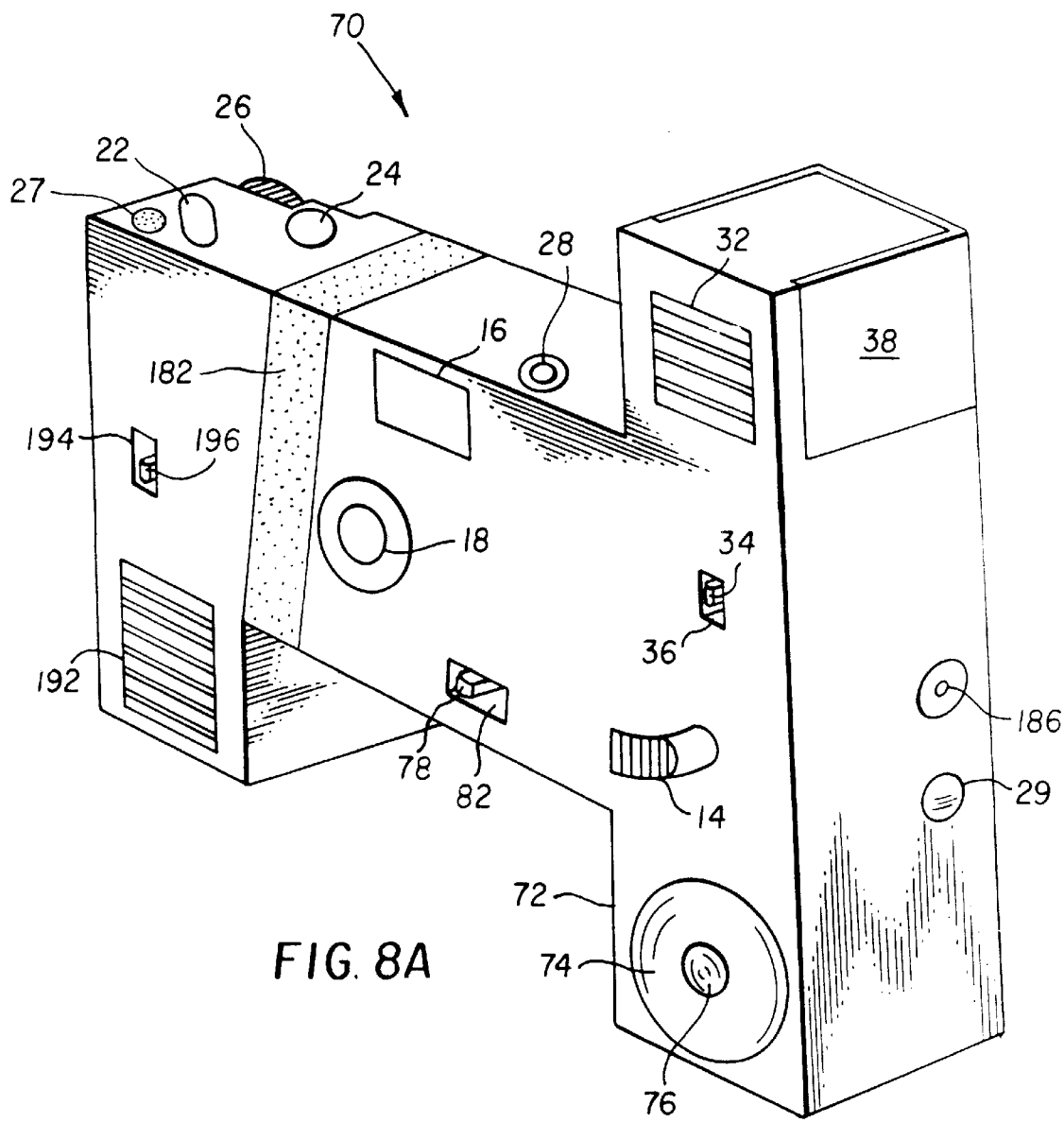
FIG. 8A illustrates a camera that is provided with the ability to provide continuous illumination, take flash pictures, and provide continuous intermittent flash in all directions for use as a warning device.

FIG. 8A illustrates a camera 70 with reflector 182 that has substantially the same structure as camera 30 but has additionally been provided with a flashlight module 72 and siren 192. The flashlight module 72 incorporates a reflector 74 and a flashlight bulb 76. When it is decided to use a camera as a flashlight, the switch 78 is moved to position 82 to provide continuous light. This camera, therefore, has four uses of the same battery power for a siren, for ordinary flash pictures, for emergency continuous, intermittent flashing as a strobe, and as a flashlight. The flashlight both can serve as emergency illumination such as light for a camera owner whose car has broken down, or as light to allow the user of the camera to frame a picture which will be taken with a flash. The single-use camera in FIG. 8A further incorporates a jack 186 that may be utilized for providing a separate continuous power source to the camera. The camera of FIG. 8A with its siren, strobe, flash picture-taking ability, and flashlight, therefore, serves as a very effective safety device. If someone carrying the camera becomes concerned about another person, they could take their picture, set off a strobe and a siren, as well as lighting up the potential attacker or thief with a continous light beam. The noise and sound generated would serve to discourage any aggression, as sufficient attention would be directed towards the single-use camera which was flashing and sounding a warning.

Figure 8B:
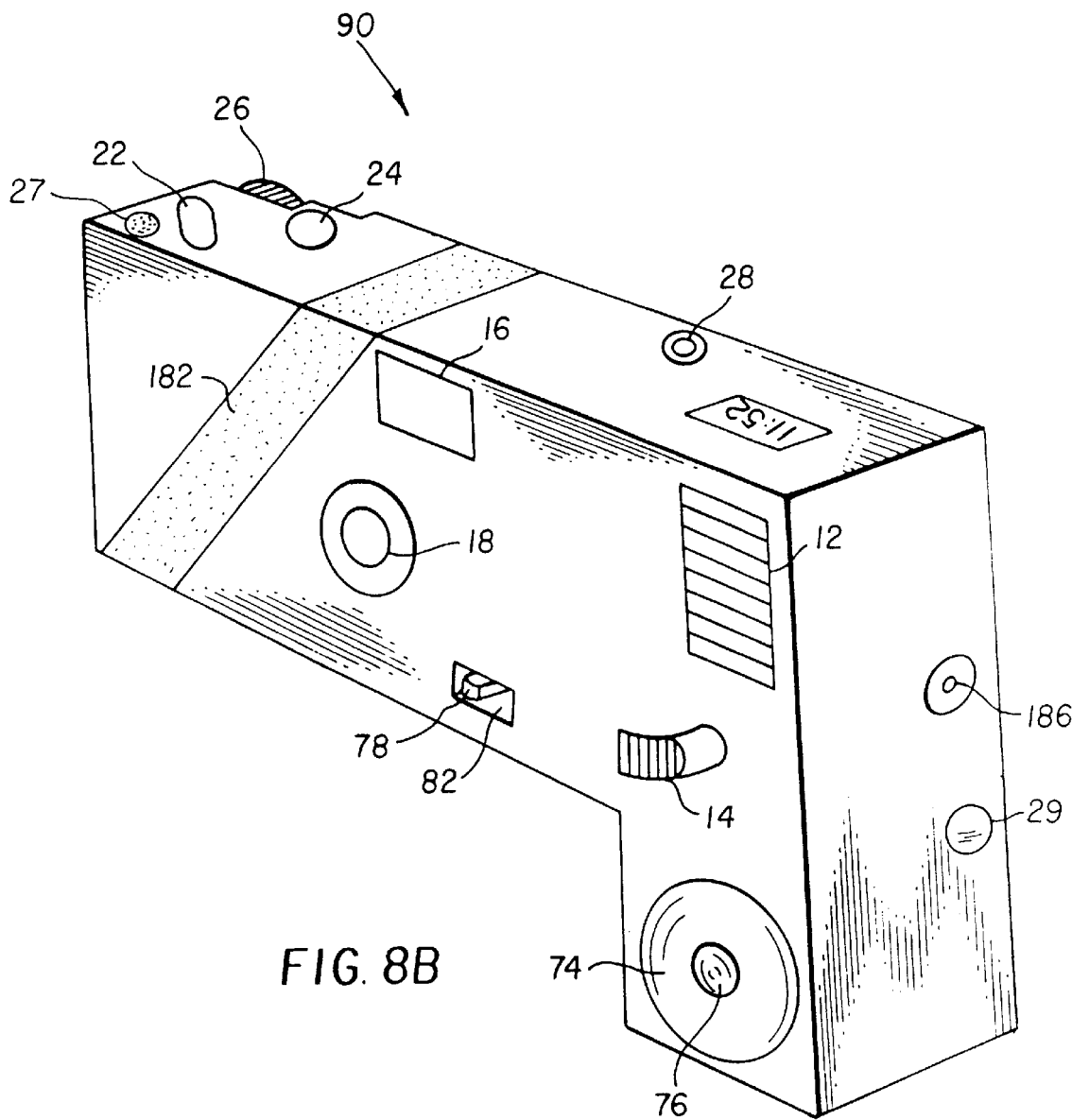
FIG. 8B illustrates a flash camera also having means for continuous illumination.

FIG. 8B illustrates a camera that has been provided with siren, a clock, and a continuous illumination device. The camera has a conventional flash unit 12. It is provided a means provided with continuous illumination by bulb 76 that is rounded by reflector 74. The continuous light source is activated by movement of switch 78 into area 82. The clock 92 allows the user to know the time events take place and is a convenience possible with the battery power source of the camera.

While the cameras illustrated may not be aesthetically pleasing, it is within the skill of the art to design a to design a generally rectangular camera incorporating the motion detection, continuous flashing, siren, and flashlight features of the cameras in a more pleasing package that would fall readily to hand. Most generally, the requirements for easy handling, optional concealment, and transportability in, for example, a pocket are met when the one-time-use, single-use, or film-with-lens camera as described herein has a total volume of less than about 450 cubic centimeters ($cm^3$), preferably the total volume is less than about 340 $cm^3$, more preferably the total volume is less than about 220 $cm^3$, and most preferably the total volume of the camera is less than about 100 $cm^3$. The width to height to length of such a camera will generally be in an about 1:2:4 ratio, with a range in each dimension of about 25% so as to provide for comfortable handling and pocketability. Additionally, the camera will preferably have the majority of corners and edges finished with a radius-of-curvature of between about 0.2 and 2 centimeters. Camera 30 illustrates a pivoting flash based on a generally rectangular camera. Further, it is possible that the whole corner of a generally rectangular camera could be removed to expose a bulb which would then become visible over a wide range.

While several variations of cameras of the invention are shown, it should be understood that the motion detection, reflective, and siren features may be combined with each other or any combination of the features shown, such as continuous light, intermittent flash, and exterior power.

The electronic circuitry required for the cameras, such as the instant invention, is illustrated in FIGS. 9–15 which will be described below. As this is intended to general circuitry, the numbers for the switches and bulb are not consistent with the camera descriptions, although as above stated, the numbers within the cameras' descriptions are consistent.

Figure 9:
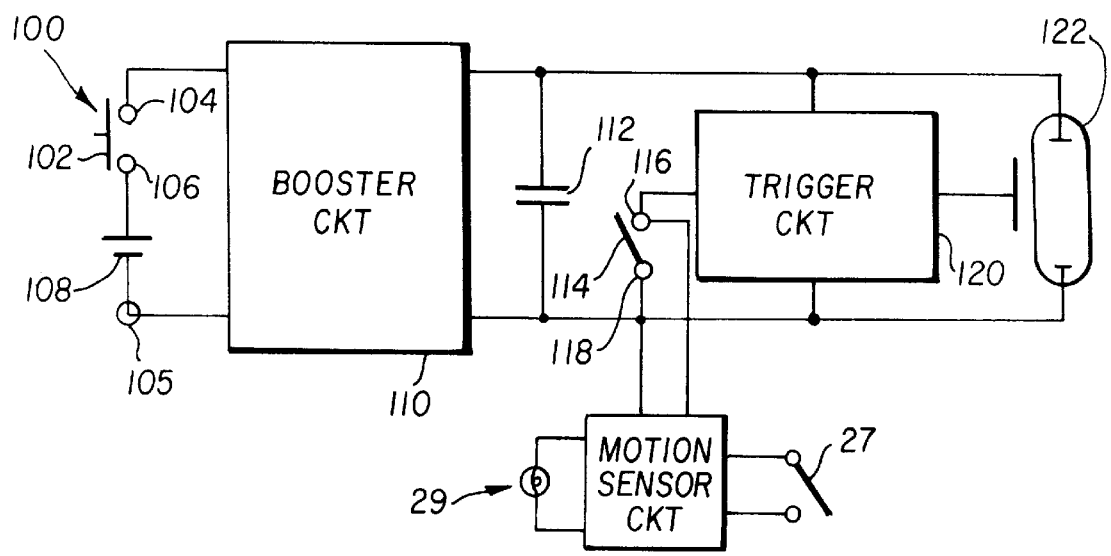
FIG. 9 shows the circuitry of a flash unit with motion sensor activation as employed in a compact single-use camera of FIG. 1.

FIG. 9 shows the circuitry of a flash unit as employed in a compact single-use camera as disclosed in U.S. Pat. Nos. 5,235,364 and 5,315,332 which has been modified to incorporate a motion-sensor. The flash circuit includes the battery 108 as a power source, the main capacitor 112, the syncroflash switch 114, the charge switch 100, a voltage booster circuit 110, a trigger circuit 120, a discharge tube 122, and contact points 104, 105, 106, 116 and 118. In operation, activation of the charge switch 100 enables conductive charge switch plate 102 to connect contact points 104 and 106, thereby providing power from battery 108 to the voltage booster circuit 110 which in turn charges the main capacitor 112. Contact points 105 and 118 form a common with one side of booster circuit 110. Activation of syncroflash switch 114 enables an electrical connection between contact points 116 and 118 which, in turn, causes the trigger circuit 120 to provide a voltage spike to the discharge tube 122 causing the tube to become conductive and the charge stored on main capacitor 112 to be discharged through tube 122, thereby causing a light flash. In this circuit configuration, it is understood that the voltage supplied by the voltage booster circuit 110 and stored on capacitor 112 is insufficient to cause discharge tube 122 to fire in the absence of a signal, in the form of a high voltage spike from trigger circuit 120. The charge switch 100 may be activated by a push button as described in the art, while the syncroflash switch 114 is activated either directly by the camera shutter release mechanism, by full opening of the camera aperture or shutter, or by a combination of both. Alternatively, the charge switch may be activated by the film advance mechanism of the camera as described in U.S. Pat. No. 5,337,099.

The motion sensor circuit is configured to provide an alternate method of completing the connection between contact points 116 and 118 when accelerated. The motion sensor circuit is provided with an activation switch 27 and an optional motion sensor ready indicator light 29. The motion sensor circuit can draw power either directly from battery 108 or from the booster circuit 110 as appropriate. The wiring for these power connections is omitted for clarity. In the embodiment shown, closure of switch 27 activates the booster circuit and separately activates the motion sensor circuit. Activation of the booster circuit by causing electrical contact between contact points 104 and 106 provides high voltage for firing the flash unit. The wiring for this connectivity from switch 27 is omitted for clarity. Activation of the motion sensor circuit causes the motion sensor ready indicator light 29 to be lit. Acceleration, jostling, or motion of the motion sensor causes the contact point 116 and 118 to be electronically connected, thereby enabling the flash unit to fire and give a warning independent of the state of the shutter release mechanism of the camera.

The motion sensor circuit of FIG. 9, as employed in FIG. 1, may be additionally configured to activate the film shutter mechanism. This optional embodiment may be utilized when it is desired to cause a picture to be exposed as a result of motion imparted to the motion sensor. Here, the film advance wheel 26 is first advanced to bring film into position for exposure and to set the shutter release. Then, closure of switch 27 activates the booster circuit and the motion sensor circuit. Acceleration of the motion sensor causes the flash unit to fire and the shutter to open, thereby both providing a warning and recording the scene. In this embodiment the shutter release mechanism is modified such that shutter is released on a signal provided by the motion sensor circuit. In one embodiment, a solenoid activated by the motion sensor circuit trips the shutter release mechanism. In another embodiment, the shutter release mechanism incorporates a magnetic member and an electromagnetic member which retards release of shutter until the electromagnetic member is de-energized on signal from the motion sensor circuit. In yet another embodiment, the connectivity to the flash unit may be omitted.

The motion sensors useful in the invention include all the motion sensors known to the art. In a preferred embodiment, the motion sensor is an accelerometer. Accelerometers can be electromechanical devices which change in conductivity or output when moved, jostled, or accelerated. Recent disclosures of typical accelerometers and their uses include the portable alarms described at Beaudry, U.S. Pat. No. 5,006,832 and at Schwartz, U.S. Pat. No. 4,667,188; the auto anti-theft system described at Boyles, U.S. Pat. No. 5,323,140 and the microaccelerometers described by Brokaw et al at U.S. Pat. Nos. 5,345,824 and 5,417,111; and adjusting circuitry for such sensors described by Sherman at U.S. Pat. No. 5,465,604, the disclosures of which are incorporated by reference. Alternatively, inductive, magnetic, or infrared proximity detector activated switches as known in the art may be usefully employed as motion sensors.

When the motion sensor is an accelerometer, the accelerometer will generally be chosen to detect an acceleration of between about 0.001 and 10,000 g's. A g is the acceleration of gravity at sea level and has a metric value of about 9.8 m/s$^2$. It is preferred that the accelerometer be able to detect accelerations of between about 0.005 and 500 g's, and most preferred that the accelerometer be able to detect accelerations of between about 0.01 and 5 g's. It is preferred that the motion sensitive cameras of the invention comprise means to adjust the sensitivity of the associated motion sensor to motion so that the user can avoid false alarms. It is also preferred that the motion sensitive camera of the invention comprise means to adjust the activation threshold of the motion sensor so that the user can choose the minimum level of motion required to trigger the incorporated camera functions. When the camera is capable of providing more than one camera function as a result of detected motion, the camera can additionally have an associated function selection switch.

The motion sensor may be integrally mounted to the camera or it may be attached to the camera by one or more rigid members. Alternatively, the motion sensor may be remotely connected to the camera by flexible, conductive wires or cables. In yet another embodiment, the camera and motion sensor may be physically separate, but in communication employing a transmitter associated with the motion sensor and a receiver associated with the camera. When this connectivity is provided by wires or cables, they may be permanent or temporary. Temporary cables can be connected by plugs, jacks, and the like.

Figure 10:
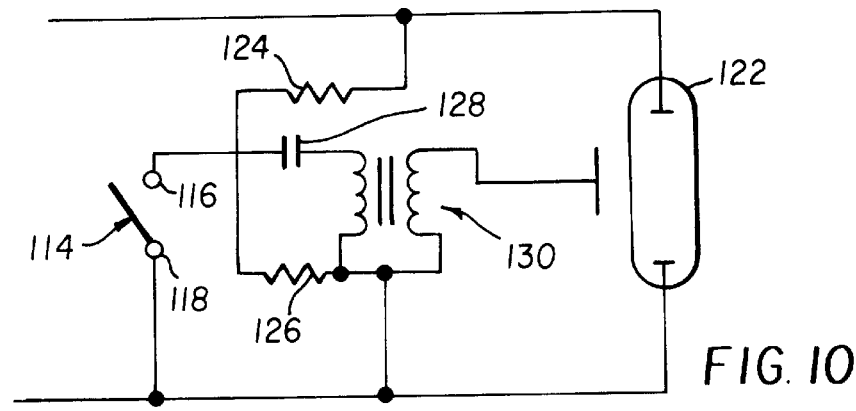
FIG. 10 illustrates circuitry of the trigger circuit of FIG. 9.

The trigger circuit 120 of FIG. 9 is shown in greater detail in FIG. 10. Here, a portion of FIG. 10 is reproduced to better illustrate the relationship of the trigger circuit to the entire flash unit circuit. All parts not otherwise identified have the same meaning as already described. Resistors 124 and 126 of the trigger circuit form a voltage divider which enables appropriate charging of capacitor 128 from the output of booster circuit 110. Activation of the syncro-flash switch 114 shorts resistor 126 which, in turn, causes the rapid discharge of the charge stored on capacitor 128 through the primary coil of transformer 130. This, in turn, induces a voltage spike from the secondary coil of transformer 130 which is applied to the dischage tube 122 causing it to fire.

Figure 11:
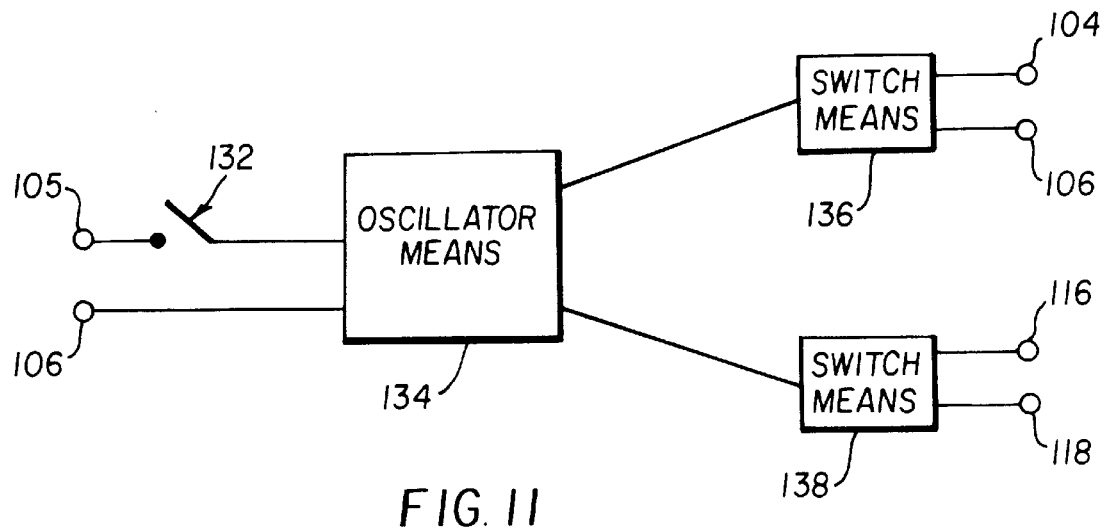
FIG. 11 shows a circuit enabling repeated discharge of a flash unit.

FIG. 11 shows a generalized flash repeater modification of the circuit of FIG. 9, enabling repeated discharge of the flash unit. The repeating flash unit includes an activation means 132, an oscillator means 134, and two switch means 136 and 138. These means are interconnected to the flash unit of FIG. 9 through contact points 104, 105, 106, 116, and 118. All parts not otherwise shown have the same meaning as already described. Repeated discharge is achieved by closure of switch 132 which activates oscillator means 134 which, in turn, causes switch means 136 and 138 to activate in an alternative fashion. When switch means 136 is activated, contact points 104 and 106 are connected, thereby providing power to the booster circuit 110 and charging main capacitor 112. When switch means 138 is activated, contact points 116 and 118 are connected, thereby enabling trigger circuit 120 to cause flash discharge tube 122 to fire. The frequency of oscillator means 134 can be chosen to enable repeated firing of discharge tube 122 at a low frequency, thereby providing an emergency flash unit, or at a higher frequency thereby providing a nearly continuous light source.

Figure 12:
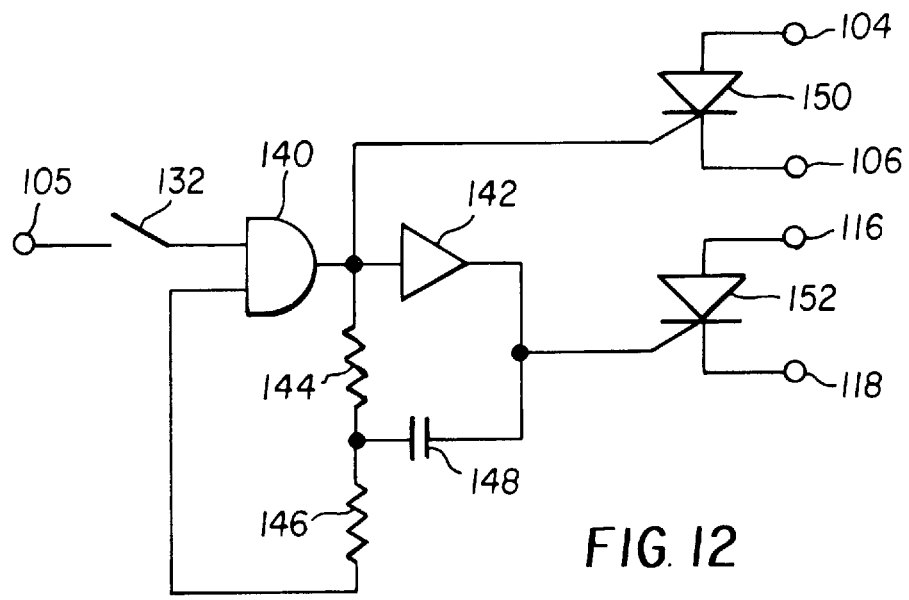
FIG. 12 shows details of an embodiment of the repeating discharge flash unit of FIG. 11.

FIG. 12 shows details of an embodiment of the repeating discharge flash unit of FIG. 11. Here NAND GATE 140 and NOT GATE 142 are additionally powered and initially biased by connection to point 106. Activation of switch means 132 provides a high signal to the first input of NAND GATE 140, while the second input of the NAND GATE 140 is biased with a low signal. The output of the NAND GATE is high, and silicone controlled rectifier 150 becomes conductive, thus shorting contact points 104 and 106 thereby powering the booster circuit 110 and causing the main capacitor 112 to become charged. NOT GATE 142 ensures that silicone controlled rectifier 152 is always reverse biased relative to silicone controlled rectifier 150 and thus that contact points 104 and 106, and contact points 116 and 118 will be alternatively closed. Resistors 144 and 146, together with capacitor 148, form a feedback RC timing circuit. As capacitor 148 becomes fully charged, the second input of the NAND GATE 140 is driven to a high signal, thereby causing the output of the NAND GATE 140 to be low and the output of the NOT GATE 142 to become high. In this condition, silicone controlled rectifier 150 becomes non-conductive, while silicone controlled rectifier 152 becomes conductive and enables trigger circuit 120 to cause discharge tube 122 to fire. After a suitable time delay, the RC timing circuit again reverses the second input to NAND GATE 140, the initial condition is restored, and the cycle repeats. Here, the flash frequency is controlled by choice of the capacitance and resistance of the capacitor and resistor of the RC circuit.

In one embodiment suitable for emergency signaling use with a low frequency flash, activation switch 132 can be linked to the discharge tube revelation means previously described, thereby simultaneously exposing discharge tube 122 for wide angle illumination and activating the flash repeater circuit. In another embodiment, the camera body may carry a selection means which suitably alters the repeat frequency of oscillator means 134, thereby enabling either continuous illumination or emergency flash to be obtained. For example, in the feedback RC timing circuit described above, resistor 144 can be replaced by a variable resistor or shunted to a lower resistance to increase the flash repeat frequency.

Figure 13:
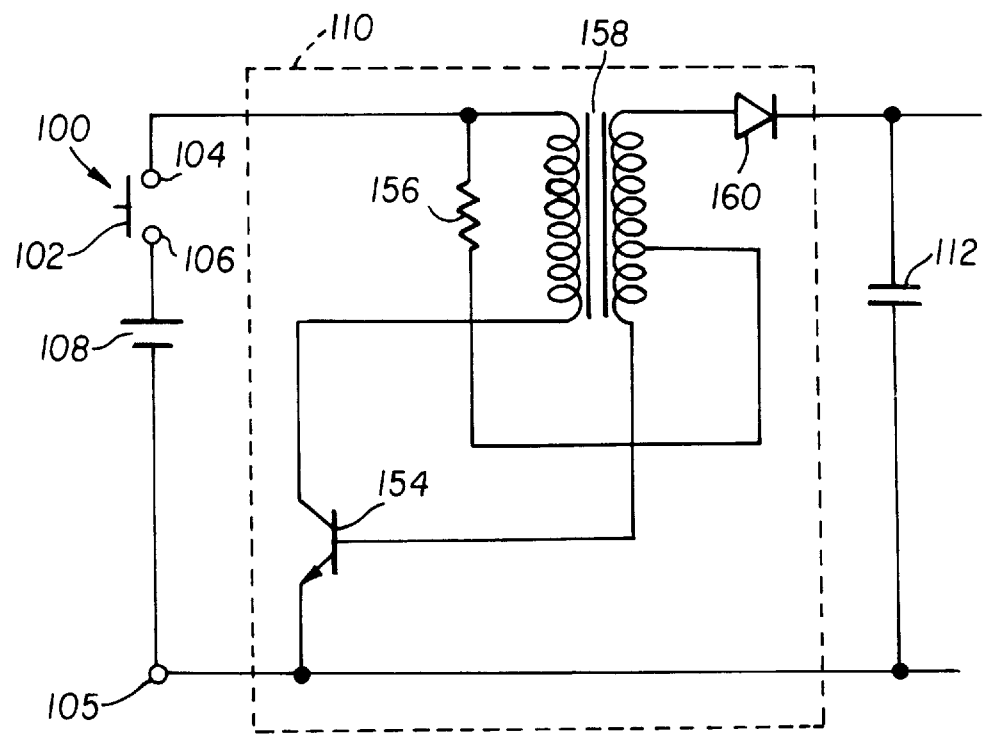
FIG. 13 illustrates circuitry of the voltage booster circuit of FIG. 9.

The voltage booster circuit 110 of FIG. 9 is shown in greater detail in FIG. 13. Here, a portion of FIG. 9 is reproduced to better illustrate the relationship of the trigger circuit to the entire flash unit circuit. All parts not otherwise identified have the same meaning as already described. The known voltage booster circuit 110 is constituted of a transistor 154, a resistor 156, a transformer 158, and a diode 160. When contact points 104 and 106 are connected, a low voltage is supplied to the booster from battery 108. The transistor 154 repeats on and off states alternately to supply pulsing current to the primary coil of the transformer 158 which causes high-voltage alternating current to be generated in the secondary coil. The alternating current generated in the secondary coil is converted to direct current by the diode 160. The transistor is driven to the alternate on and off states by the resistive-inductive feedback circuit formed by the resistor 156 and the coils of transformer 158. The voltage boost supplied by the voltage booster is related to the number of turns in the primary and secondary coils of the transformer 158.

Figures 14, 15:
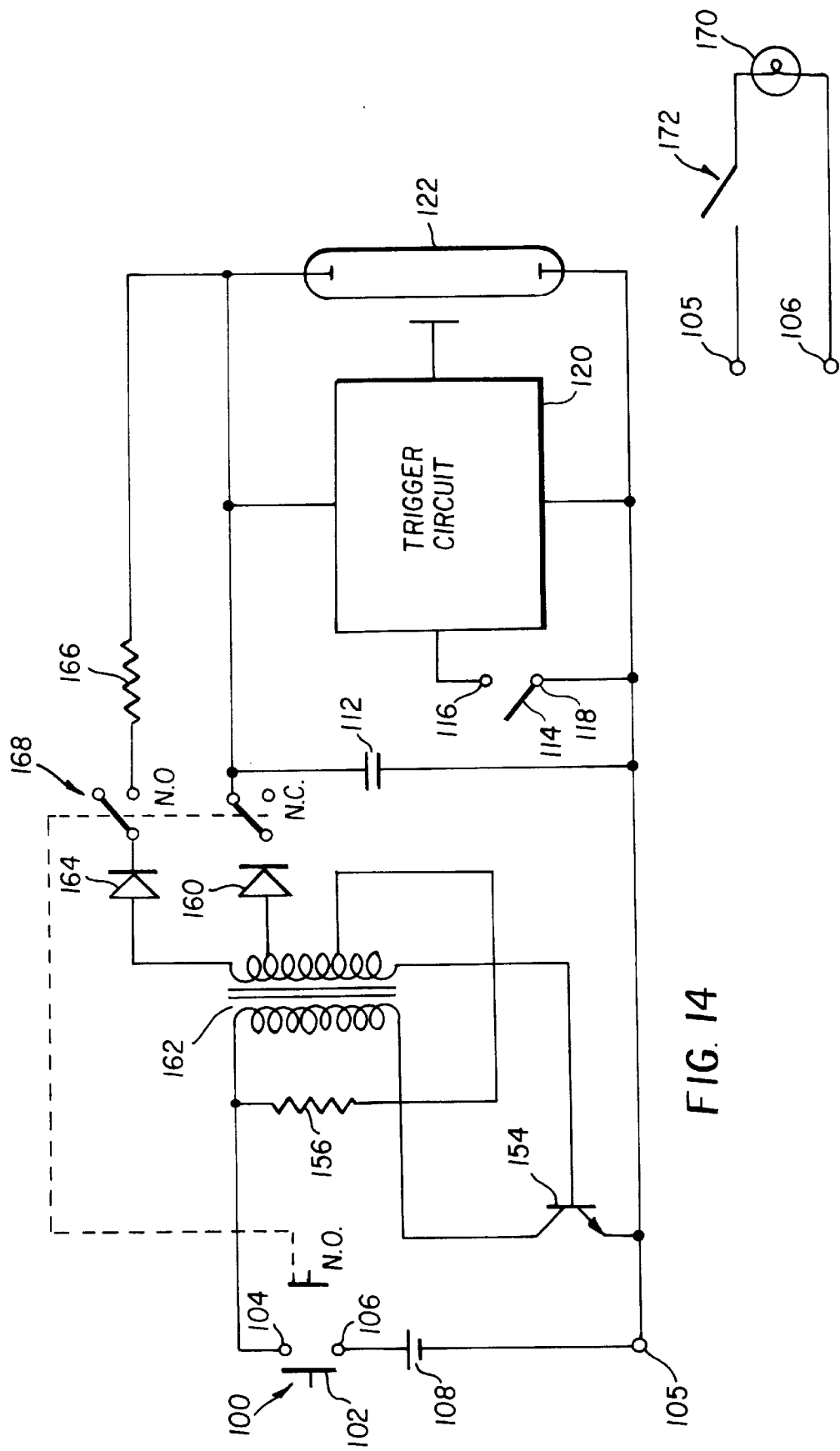
FIG. 14 shows a second modification of the circuit of FIG. 9 enabling repeated discharge of the flash unit.
FIG. 15 shows a modification of the circuit of FIG. 9 enabling continuous illumination.

FIG. 14 shows a second modification of the circuit of FIG. 9 enabling repeated discharge of the flash unit. The components include a transformer 162, a diode 164, a resistor 166, and a ganged switch means 168 with one normally closed connection and two normally open connections. Transformer 162 differs from transformer 158 in that the secondary coil includes additional windings and an additional winding tap-point, thereby enabling transformer 162 to deliver either the same voltage output from the tap-point as is normally required to drive the flash unit or a higher voltage. When ganged switch means 168 is in the normal position (shown in FIG. 14), power is supplied through diode 160 in the normal manner and the flash unit circuit operates in the manner already described. When ganged switch 168 is activated, three circuit changes are simultaneously enabled. First, contact points 104 and 106 are connected, thereby providing battery power to the voltage booster circuit 110. Second, diode 160 is disconnected from the remainder of the circuit. Third, power is supplied to the main capacitor 112 through diode 164 and resistor 166. The number of windings in the secondary coil of transformer 162 are chosen to provide a voltage higher than the discharge voltage of flash tube 122. Thus, as capacitor 112 becomes fully charged through resistor 166, flash discharge tube 122 discharges spontaneously and the charging cycle begins again. The rate of flashing is related to the RC time constant for charging capacitor 112 through resistor 166 and can be made longer or shorter by choice of the exact voltage delivered from transformer 162 and by the resistance supplied by resistor 166.

In one embodiment suitable for emergency signaling use with a low frequency flash, activation switch 168 can be linked to the discharge tube revelation means previously described, thereby simultaneously exposing discharge tube 122 for wide angle illumination and activating the flash repeater circuit. In another embodiment, the camera body may carry a selection means which suitably alters the repeat frequency of flashing, thereby enabling either continuous illumination or emergency flash to be obtained. For example, in the feedback RC timing circuit described above, resistor 166 can be replaced by a variable resistor or shunted to a lower resistance to increase the flash repeat frequency, thereby providing apparently continuous illumination.

FIG. 15 shows a modification of the circuit of FIG. 9 enabling continuous illumination. This modification includes a prefocused low voltage incandescent bulb 170 (76 in FIG. 8A) and an activating switch means 172 (78 in FIG. 8A). Only the connection points 105 and 106 of FIG. 9 are shown. Here activation switch 172 can be linked to the bulb revelation means previously described, thereby simultaneously exposing bulb 170 for wide-angle illumination and activating the bulb circuit. In another embodiment, the bulb may be provided in a revealed manner and the activation switch employed to power the bulb circuit.

The exact light output of the continuous or emergency illumination means is not critical to the normal operation of the film with lens or single-use camera according to the invention since the illumination thus provided is not generally intended to enhance picture taking per se, but rather to provide collateral value to the owner of such a camera. However, better control of the light output can be provided by addition of a flash commutation capacitor or other control circuitry as known in the art. Some examples are the circuit control means described at U.S. Pat. Nos. 5,250,977; 4,608,522; 4,717,861; 4,626,093; 4,591,762; 4,847,538; and 4,275,335. Additional useful circuitry is described at U.S. Pat. Nos. 5,250,978; 5,159,381; 5,189,344; 4,613,847; and 4,623,824.

While the control circuits, electro-optical means and mechanical means described above have been generally directed towards single-use cameras with incorporated power and flash units, they can be directly applied to single-use cameras designed for use with accessory reusable electronic flash units. Such units are, for example, described in U.S. Pat. Nos. 4,801,957; 4,903,058; 4,973,998; and 5,003,330.

While the above descriptions of cameras and circuitry for multiple types of lighting are considered representative of this invention, it is, of course, possible within this invention to provide other variations of exposable flashing units and continuous exposure flashlights. For instance, the flashlight element could be provided with a squeeze activation such that when a portion of the camera was squeezed, the continous light would come on. This might be particularly desirable when the flashlight was intended to illuminate a picture prior to flash and would require only brief illumination when the camera was in position to take a picture. In other variations, the flashing unit could be on an extendable device that is raised from the camera for picture taking. The devices are known in reusable cameras to prevent red eye by raising the flash away from the lens. These and other variations are intended to be included by this invention which is only intended to be limited by the scope of the claims attached hereto.

Figure 16:
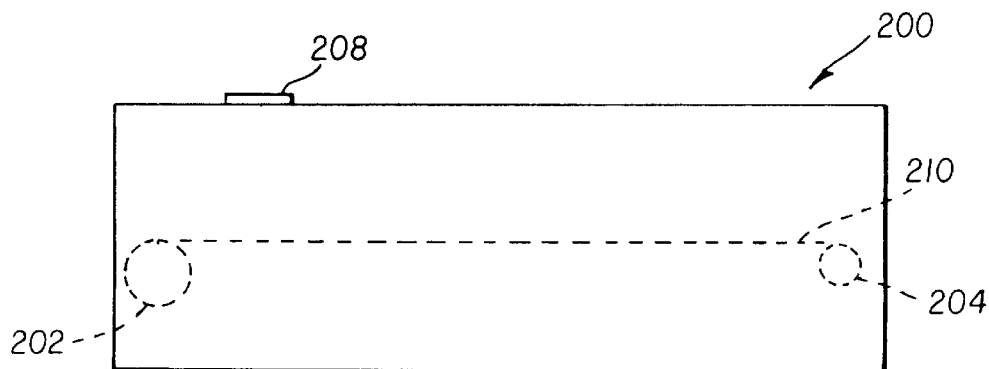
FIG. 16 shows a top view of a camera with two lens units disposed asymmetrically on opposing faces of a camera body.
Figure 17:
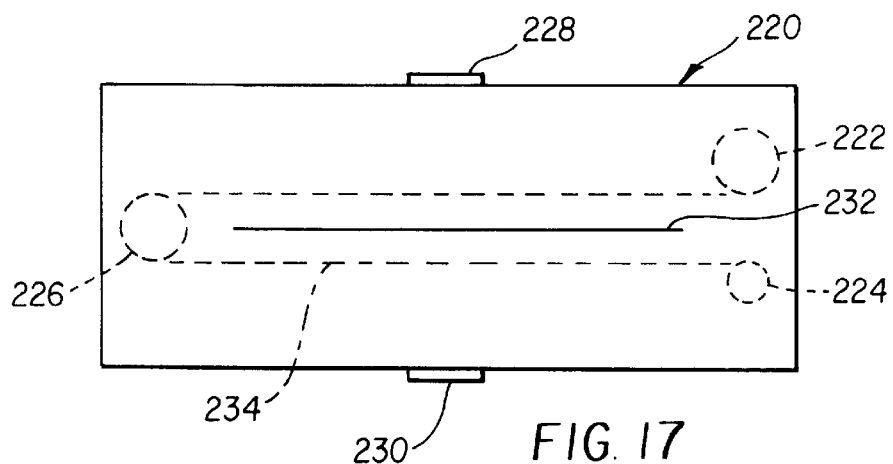
FIG. 17 shows a top view of a camera with two lens units disposed symmetrically on opposing faces of a camera body.
Figure 18:
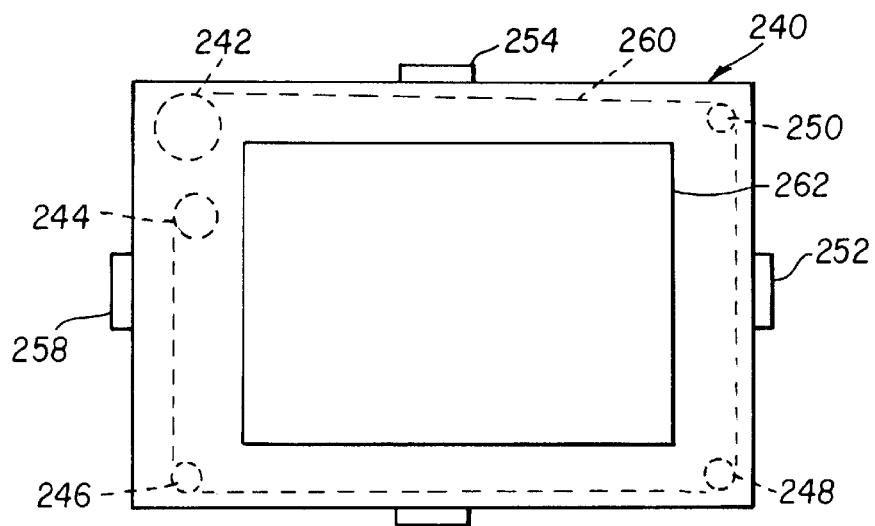
FIG. 18 shows a top view of a camera with four lens units disposed on distinct faces of a camera body.

Alternative arrangements of films and lenses within the motion sensing camera according to the invention are shown in FIGS. 16–18. These later arrangements are particularly suited for applications where the motion sensor circuit is employed to cause the camera to expose pictures as a result of motion, thereby recording the event that caused the motion. These arrangements are useful in motion sensitive cameras to be employed as safety, security, anti-crime, and insurance recording devices.

FIG. 16 shows a top view of a one-time-use camera in which two lens shutters and lens units are disposed on opposing faces of the camera body. The camera body 200 includes a film supply reel 202 and a film take-up reel 204, as well as laterally displaced lens 206 and 208. The camera is loaded with a light sensitive film 210 suitable for exposure from either side of the film support. Film 210 may be either a color or black and white film. It may have all of the emulsions coated on one side of the support in which case two sided exposure is preferably enabled by omission of the typical antihalation layer. In a preferred embodiment, film 210 is a duplitized film which means that at least one sensitized layer is present on each side of the film support. While film 210 can have any known sensitivity, higher sensitivities are preferred since the intention is to reduce or eliminate motion blurred images captured in a potentially moving camera. ISO sensitivities ranging from ISO 100 to ISO 6400 are specifically contemplated. The high film speed allows faster shutter speed which is less sensitive to camera motion. The lenses 206 and 208 are laterally displaced so that distinct regions of the film are exposed by each lens. Interposed between each lens and the film is a shutter mechanism and the shutter mechanisms are ganged such that exposures are taken from both sides of the camera body simultaneously. The remainder of the camera body features are as previously described.

FIG. 17 shows a top view of another one-time-use camera in which lenses and shutters are disposed on opposing faces of the camera body. Here, the camera body 220 includes a film supply reel 222, a film take-up reel 224, a film guide member 226, opposing lens units 228 and 230, an opaque baffle 232, and a light sensitive film 234. Interposed between each lens and the film is a shutter mechanism, and the shutter mechanisms are linked or ganged such that exposures are taken from both sides of the camera body simultaneously. The lens may be typical lenses as employed in one-time-use cameras as described below or may be wide angle lenses specifically designed to enable capture of a wide angular scene content even at the cost of image quality. The remainder of the camera body features are as previously described. Film 232 can be a black-and-white film or can be a color film. It can have any known sensitivity, but higher sensitivities are again preferred so as to reduce motion induced image blur. ISO sensitivities ranging from ISO 100 to ISO 6400 are specifically contemplated.

FIG. 18 shows a top view of another one-time-use camera in which lenses and shutters are disposed on four opposing faces of the camera body. Here, the camera body 240 includes a film supply reel 242, a film take-up reel 244, a film guide members 246, 248 and 250, twin opposing lens units 252, 254, 256 and 258, an opaque baffle 262 which may be of segmented or unitary construction, and a light sensitive film 260. Interposed between each lens and the film is a shutter mechanism and the shutter mechanisms are ganged such that exposures are taken through each simultaneously. The remainder of the camera body features are as previously described. Film 260 can be a black-and-white film or can be a color film. It can have any known sensitivity, but higher sensitivities are again preferred. ISO sensitivities ranging from ISO 100 to ISO 6400 are specifically contemplated.

Figure 19:
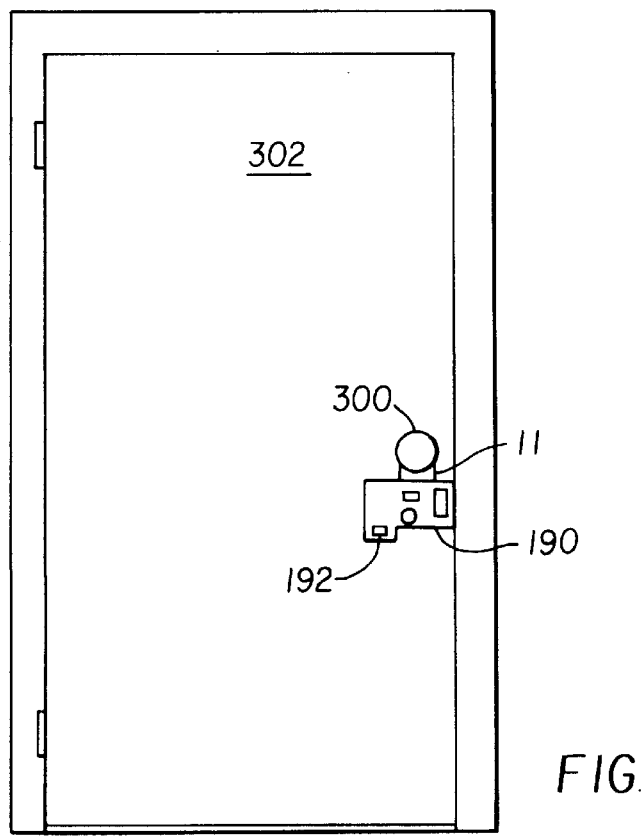
FIG. 19 shows a camera with motion sensor suspended from a doorknob.

FIG. 19 shows a camera 190, according to the invention suspended by member 11, from a doorknob 300 of a door 302. This figure illustrates how the camera might be positioned to act as a warning device for a traveler in a motel or hotel. Here motion of the door or doorknob triggers the auxiliary siren 192 incorporated in the camera, thus warning of an intrusion in progress.

Figure 20:
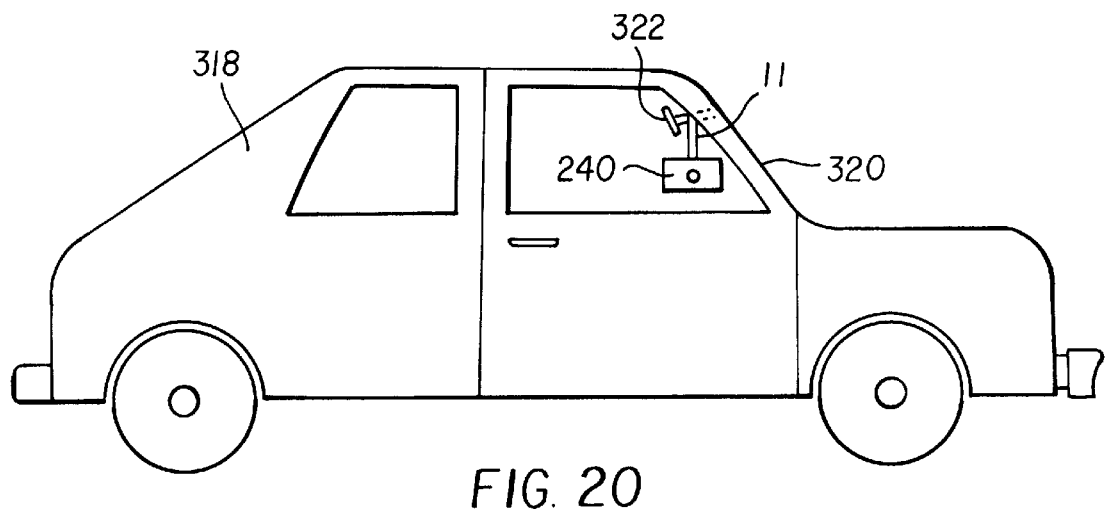
FIG. 20 shows a camera with motion sensor installed in a vehicle.

FIG. 20 shows a one-time-use-camera 240 suspended in a vehicle 318. Here camera 240 is suspended by strap 11 from the vehicle rearview mirror 322 which, in turn, is mounted on the front motion of 320. Here, motion of the unattended vehicle causes photographs to be taken over a 360 radius, thus recording the identity of that which caused the motion. This arrangement is particularly suited to protecting a parked vehicle. In another embodiment, the motion sensor may be set to trigger only under massive acceleration or deceleration as encountered in a moving vehicle during an accident. In this case, the accident is recorded for law enforcement and insurance purposes. In yet another embodiment, the motion sensitive one-time-use camera may be an integral component of the vehicle or may be incorporated in a hidden manner so as to provide the protections afforded without providing indication that a protective device is in place.

The camera may employ a motion sensor in common with other vehicle devices as, for example, fuel cutoff switches, air bags, or seat belt inertial locks.

In another embodiment not shown, the camera may be provided with a fixed support and an electrical or mechanical means which rotate the camera through a circular or semicircular motion while simultaneously advancing the film. The electrical means may be a motor while the mechanical means may be a spring-loaded, rotational, clockwork drive. In this embodiment, the entire camera body rotates, thus obviating the need for multiple lens and ganged shutter units.

Any camera speed imaging means employable in known cameras, and particularly in known single-use, one-time-use, or film-with-lens cameras may be employed as the image capture means of the current invention. These image capture means include, but are not limited to, silver halide elements and semiconductor arrays. These single-use cameras of the invention can provide specific features as known in the art such as shutter means, film advance means, waterproof housings, single or multiple lenses, lens selection means, variable aperture, focus or focal length lenses, means for monitoring lighting conditions, means for altering shutter times or lens characteristics based on lighting conditions or user provided instructions, and means for recording use conditions directly on the film.

These features include but are not limited to: providing simplified mechanisms for manually or automatically advancing film and resetting shutters as described at Skarman, U.S. Pat. No. 4,226,517; providing apparatus for automatic exposure control as described at Matterson et al, U.S. Pat. No. 4,345,835; moisture-proofing as described at Fujimura et al, U.S. Pat. No. 4,766,451; providing internal and external film casings as described at Ohmura et al, U.S. Pat. No. 4,751,536; providing means for recording use conditions on the film as described at Taniguchi et al, U.S. Pat. No. 4,780,735; providing lens fitted cameras as described at Arai, U.S. Pat. No. 4,804,987; providing film supports with superior anti-curl properties as described at Sasaki et al, U.S. Pat. No. 4,827,298; providing a viewfinder as described at Ohmura et al, U.S. Pat. No. 4,812,863; providing a lens of defined focal length and lens speed as described at Ushiro et al, U.S. Pat. No. 4,812,866; providing multiple film containers as described at Nakayama et al, U.S. Pat. No. 4,831,398 and at Ohmura et al, U.S. Pat. No.

4,833,495; providing films with improved anti-friction characteristics as described at Shiba, U.S. Pat. No. 4,866,469; providing winding mechanisms, rotating spools or resilient sleeves as described at Mochida, U.S. Pat. No. 4,884,087; providing a film patrone (container) removable in an axial direction as described by Takei et al at U.S. Pat. Nos. 4,890,130 and 5,063,400; providing an electronic flash means as described at Ohmura et al, U.S. Pat. No. 4,896,178; providing an externally operable member for effecting exposure as described at Mochida et al, U.S. Pat. No. 4,954,857; providing film support with modified sprocket holes and means for advancing said film as described at Murakami, U.S. Pat. No. 5,049,908; providing internal mirrors as described at Hara, U.S. Pat. No. 5,084,719; and providing silver halide emulsions suitable for use on tightly would spools as described at Yagi et al, European Patent Application 0,466,417 A. The disclosures of these publications are incorporated by reference.

A taking lens mounted on the single-use cameras of the invention are generally single aspherical plastic lenses having a focal length between about 4 and 100 mm, and apertures between f/2 and f/32. The focal length is preferably between about 8 and 60 mm and most preferably between about 10 and 40 mm. Apertures of between f/2.8 and f/16 are preferred with an aperture of about f/4 to f/12 being more preferred. This combination of focal length and aperture provides for good field of view with simultaneous compact camera design. The lens MTF can be as low as 0.6 or less at a spatial frequency of 20 lines per millimeter (1pm), although values as high as 0.7 or most preferably 0.8 or more are contemplated. Multiple lens arrangements comprising two, three or more component lens elements consistent with the functions described above are specifically contemplated.

The shutter means employed with the camera allows an exposure time of less than about $\frac{1}{100}$ second so as to minimize sharpness losses due to shake inherent with hand held cameras. Shutter times of $\frac{1}{125}$ sec to about $\frac{1}{500}$ sec are preferred because this provides a good balance of reduced camera motion and mechanically reproducible exposure times.

The camera provides means for exposing more than one scene per unit of film, with arrangements enabling the exposure of 6, 10, 12, 24, 27, 36 or even more distinct scenes being especially preferred.

The camera enables exposure of any desired image areas on the film. Typical are areas of less than about 10 cm². Even smaller exposure areas can be employed with values of less than 9, 8, or 7 cm² being preferred. Exposure areas of about 5 cm² or less are considered as suitable for negative film intended for use to produce snapshot size prints. Exposure areas between about 5 cm² and 0.5 .cm² are particularly contemplated.

These smaller image sizes are particularly useful when employed in smaller volume cameras.

The photographic sensitivity or speed of color negative photographic elements is inversely related to the exposure required to enable the attainment of a specified density above fog after processing. Photographic speed for color negative films with a gamma of about 0.65 has been specifically defined by the American National Standards Institute (ANSI) as ANSI Standard Number PH 2.27–1979 (ASA speed) and relates to the exposure levels required to enable a density of 0.15 above fog in the green light sensitive and least light sensitive color records of a multicolor negative film. This exposure level defines the speed point of the photographic element. This definition conforms to the International Standards Organization (ISO) film speed rating. Larger values of ISO or ANSI film speed indicate a more sensitive photographic element. Speeds between 100 and about 6400 are suitable for the film in the single-use camera of the invention. Higher speeds are preferred so as to reduce image blur from camera motion. It is contemplated that the element exhibit an ISO speed such as ISO 200, or more preferred ISO 400, and most preferred in the range of ISO 800 to ISO 1600.

Exposure latitude relates to the range of exposures that can be successfully recorded by a photographic element. For the purposes of this invention, useful latitude can be quantified by determining the exposure range which provides a straight line relationship between exposure and density after a white light exposure and processing with less than a 30% drop from straight line in either an underexposed (toe) or overexposed (shoulder) regime in a green or red color record. In order to provide a range a recordable exposures, exposure latitude in excess of 1.5 log E is typical, exposure latitude greater than 2.1 log E is suitable and exposure latitude greater than about 2.8 log E and up to about 4 log E is preferred for the single-use camera of the invention. This extended latitude provides adequate images under a wide variety of useful exposure conditions. These suitable image capture sensitivity and exposure latitudes are applicable to cameras employing either color or black-and-white silver halide elements and to cameras employing semiconductor arrays. In one embodiment, the image capture means employs light sensitive silver halide crystals coated on a support. In this embodiment, it is preferred to employ a high sensitivity, long latitude, high sharpness film exhibiting high environmental insensitivity good tone scale and color reproduction because such high quality films compensate for the known environmental trauma typically suffered by such cameras and the known lens and illumination deficiencies typically inherent in such cameras. Typical films suitable for such use are described in U.S. Pat. Nos. 5,422,231 (Nozawa) and 5,466,560 (Sowinski et al), the disclosures of which are incorporated herein by reference. In another embodiment, the camera may contain a film suitable for scanning and digitization. In yet another embodiment, the camera may employ a light sensitive array, for example, a CCD array and memory chips to capture and digitably store images without the intervention of a silver halide element. The other typical features of a digital camera would then be employed.

Additionally, the cameras of this invention may be fitted with means of accessing power from outside sources, such as 186, so as to enable continuous use of the flashing or signaling function beyond the range typically provided by the installed battery. In one embodiment, the camera body is fitted with a jack having a built-in switch to disconnect the battery when the external power source is applied. One embodiment of such an external power source is an automobile power circuit in which case a separate connector suitable for tapping power through an automobile cigarette lighter and a power cord with a built-in voltage step-down circuit may be provided. In another embodiment, the external power source is a boat power circuit. In yet another embodiment, the external power source is a portable battery. Finally, the external power source can be a high voltage AC circuit typically 120/240 volts in the United States in which case the specific separate connector will include a step-down transformer and rectifier circuit as known in the art. In an alternative embodiment, the camera body may be fitted with an activation means and a jack having a built-in switch means which together enable the flashing or continuous illumination function already described when the outside power source fails, thereby providing emergency illumination automatically.

The invention has been described in detail with particular reference to preferred embodiments thereof, but it will be understood that variations and modifications can be effected within the spirit and scope of the invention.

We claim:

1. A one time use camera comprising a light sensitive photographic element characterized in having a photographic sensitivity of greater than ISO 100 and an exposure latitude greater than about 2.1 log E, and an accelerometer which activates said camera to take a picture after motion is detected by exposure of said element for less than about 1/100 second, wherein said accelerometer detects accelerations between about 0.005 and 500 g.

2. The camera of claim 1 further comprising means to adjust at least one of the motion sensitivity and the activation threshold of the accelerometer.

3. The camera of claim 1 further comprising means to mount said camera in a vehicle.

4. A camera according to claim 1 wherein said camera further comprises a lens for exposing said element, said lens characterized in having a focal length of between 4 and 100 mm and an aperture of between f/2 and f/32, wherein said element sensitivity is between ISO 100 and ISO 6400, said element exposure latitude is greater than 2.1 log E, and said element exposure is for between 1/100 and 1/500 second.

5. A camera according to claim 1 wherein said light sensitive element is chosen from the group consisting of a silver halide film and a semiconductor array.

6. A camera according to claim 1 wherein said accelerometer is integrally mounted to said camera.

7. A camera according to claim 1 wherein said accelerometer is a microaccelerometer.

8. A camera according to claim 7 wherein said microaccelerometer is a microfabricated sensor comprising a silicon substrate.

9. A camera according to claim 1 wherein said accelerometer is a microfabricated sensor comprising a silicon substrate integrally mounted to said camera.

10. A camera comprising a motion sensor and having a body defining camera body faces wherein said camera comprises at least two lenses and at least two shutter mechanisms disposed on opposing faces of said camera body, and wherein said shutter mechanisms are activated by said motion sensor.

11. The camera of claim 10 wherein said camera is a one-time use camera.

12. The camera of claim 10 further comprising means to adjust at least one of the motion sensitivity and the activation threshold of the motion sensor.

13. The camera of claim 10 wherein said motion sensor is integrally mounted to said camera, said camera is loaded with a film having a sensitivity greater than ISO 100 and the camera shutter enables exposure of said film for less than 1/100 second.

14. The camera of claim 10 wherein said motion sensor is integrally mounted to said camera, said camera comprises a semiconductor array having a picture taking sensitivity greater than ISO-100 and the camera shutter enables exposure of said array for less than 1/100 second.

15. The camera of claim 10 further comprising means to mount said camera in a vehicle.

16. The camera of claim 10 wherein said motion sensor is an accelerometer which detects accelerations between 0.005 and 500 g.

17. The camera of claim 10 wherein said motion sensor is chosen from the group consisting of magnetic, inductive and infrared proximity detectors.

18. The camera of claim 10 comprising four lenses and four shutter mechanisms.

19. A camera comprising a motion sensor which is an accelerometer which detects accelerations between about 0.005 and 500 g and an emergency flash enabling repetitive flashes having a duration of less than about one second and a flash frequency of at least one flash every ten seconds wherein said emergency flash is activated by said motion sensor after motion is detected.

20. The camera of claim 19 wherein said camera is a one-time use camera.

21. The camera of claim 20 wherein said motion detector activates the shutter device of said camera to take a picture.

22. The camera of claim 19 further comprising means to adjust at least one of the motion sensitivity and the activation threshold of the motion sensor.

23. The camera of claim 22 further comprising means to mount said camera in a vehicle.

24. The camera of claim 19 wherein said motion sensor is chosen from the group consisting of magnetic, inductive and infrared proximity detectors.

* * * * *